(No Model.) 2 Sheets—Sheet 1.
A. SPRINGER.
MOLECULAR PIVOT BALANCE.
No. 340,010. Patented Apr. 13, 1886.
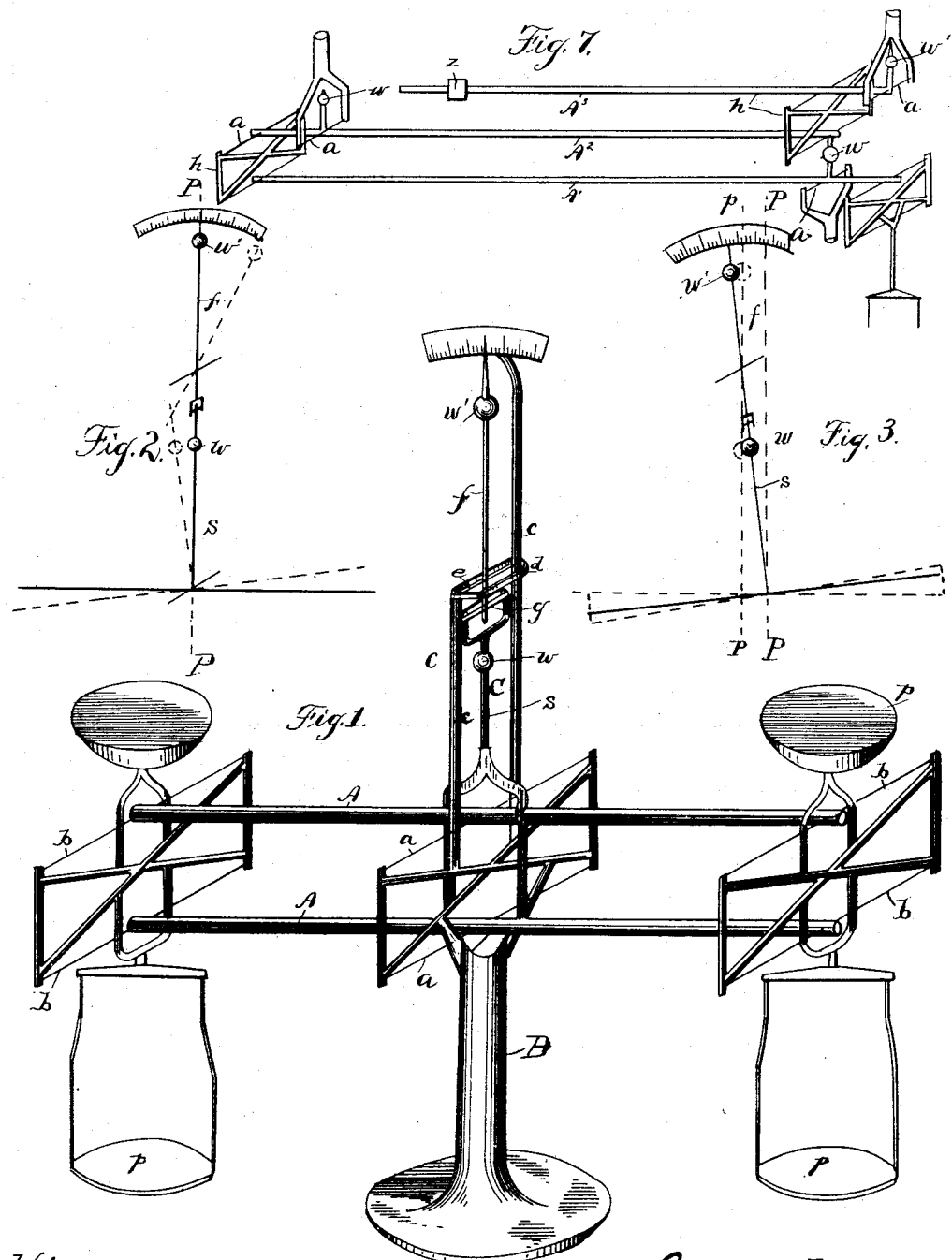

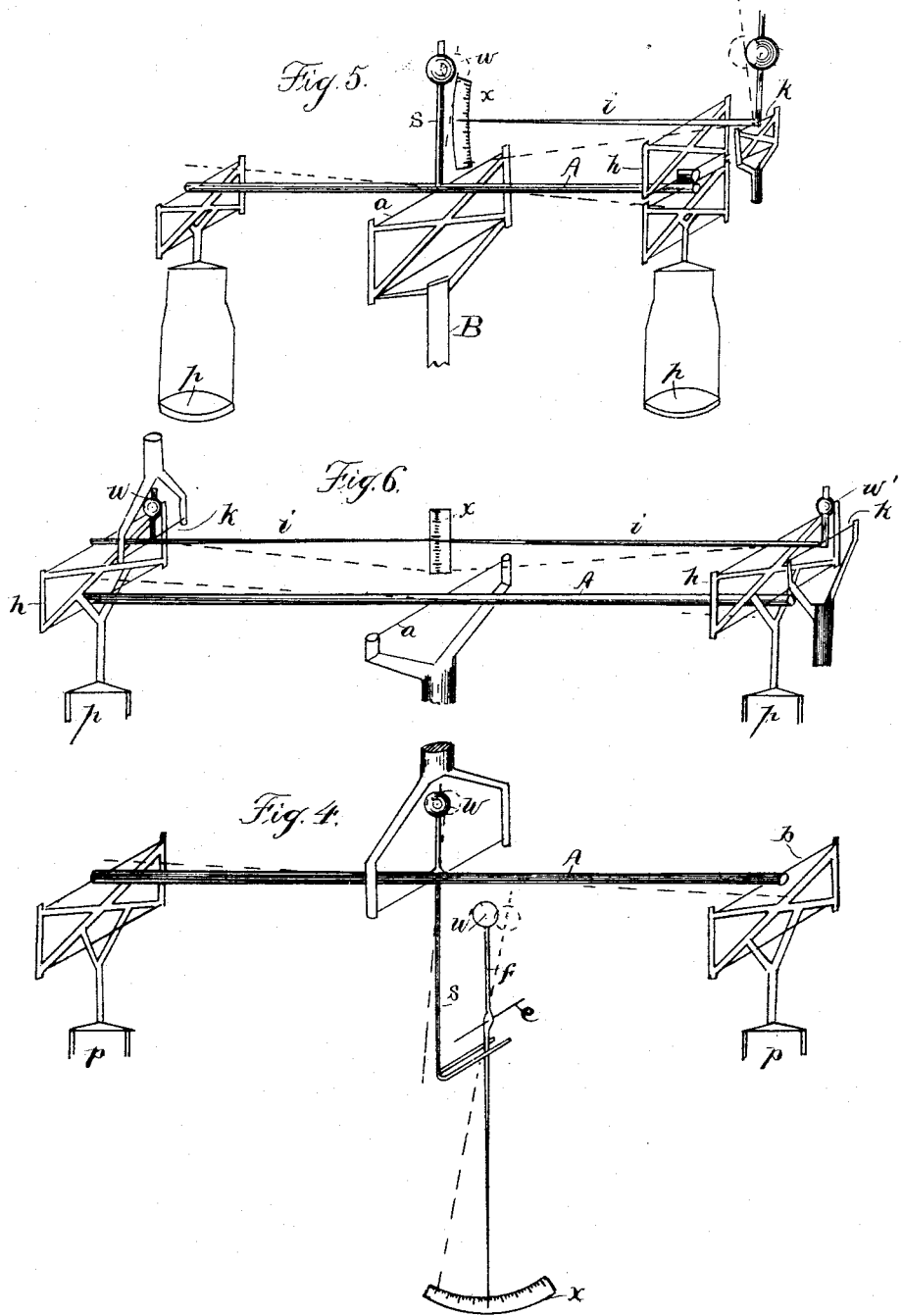

UNITED STATES PATENT OFFICE.

ALFRED SPRINGER, OF CINCINNATI, OHIO.

MOLECULAR PIVOT-BALANCE.

SPECIFICATION forming part of Letters Patent No. 340,010, dated April 13, 1886.

Application filed February 2, 1885. Serial No. 154,639. (No model.)

*To all whom it may concern:*

Be it known that I, ALFRED SPRINGER, a citizen of the United States, residing at Cincinnati, Ohio, have invented new and useful Improvements in Molecular Pivot-Balances, of which the following is a specification.

My invention relates to balances or other beam structures having the center of gravity elevated above the axis of beam rotation, as in those wherein the oscillations of the beam or beams involve a molecular displacement in the nature of torsion or flexion, as the case may be, of one or more fulcrum or load suspension pivots. In such balances the elevated center of gravity is adjusted to neutralize, to a greater or less degree, the pivotal resistances consequent upon oscillations of the beam, its zero position being arranged to coincide with that of molecular equilibrium of the pivots. Where in such balances an oscillating weight (as has been found most convenient for practical purposes) is employed to act as a counterpoise to pivotal resistance, its zero position remains always in a true perpendicular plane, whereas that of the pivots varies with the change of inclination of the base-support of the balance. This fact gives rise to a serious inherent difficulty in the use of such balances or other beam structures, owing to the practical impossibility of obtaining or maintaining an absolutely horizontal base-support, for the latter is liable to be disturbed by slight causes—such as accidental jars, displacements upon uneven floors, or even by climatic influences. When the balance is supported upon a non-horizontal base, the "poise" acts improperly and adds its weight to the depressed end of the beam, which is thus further depressed until the poise effect is counteracted by the pivotal resistance. In such case neither the poise nor the pivots occupy their proper neutral position, the beam is not in true equilibrio, and correct weighing is impossible. To remedy this difficulty by repeated leveling adjustments of the base-support from time to time is troublesome, and requires, moreover, the skillful application of a spirit-level or other delicate instruments, and a firm and unyielding supporting-pedestal, and is not always attainable even with these aids. I have sought in my present invention to provide a remedy for the difficulty in the construction of the balance itself, so as to render it independent of external conditions and preserve its accuracy and sensitiveness under all circumstances, without the necessity of troublesome leveling adjustments, so that the scale-poise, in case the structure is not furnished with a truly horizontal supporting-base, may nevertheless, although still acting by gravity, maintain a true relation between its own zero position and the molecular equilibrium of the pivot or pivots, and yet act freely to counterbalance the molecular resistance of the pivots in the oscillations of the beam.

To this end my invention consists in the combination, with the beam or beams, of a balance embodying bearings acting by molecular displacement, two or more counterpoises to pivotal resistance so arranged that when the balance is not in a true horizontal position the statical moment of one or more of such poises consequent upon such defective alignment of the beam and affecting it at one side of its fulcrum-pivot is counterbalanced and neutralized by a similar statical moment of one or more other counterpoises brought thereby into position affecting the beam at the opposite side of its fulcrum-pivot, while leaving the beam pivot or pivots in normal molecular equilibrio, and in such further relation that any pivotal deflection of the beam or beams brings into play a conjoint action of the counterpoises in opposition to the molecular resistance of the scale-pivots, thereby preserving a definite and constant relation of the poise action to the pivotal resistances, the same as in the case of a single poise with a truly-aligned beam.

The essential principles of my invention may be embodied in various concrete forms, differing only in mechanical details.

In the accompanying drawings, I have shown certain modes of its application to torsional pivot-balances, for purposes of convenient illustration, which I will now proceed to describe, premising that it is immaterial whether the pivots employed act by torsion or flexion, or whether one or more knife-edge bearings are employed in connection with the molecular pivots.

Figure 1 of the drawings is a perspective elevation of an approved form of double-beam torsion-pivot scale to which my invention is applied; Figs. 2 and 3, diagram views illustrating the operation of the poises; and Figs. 4, 5, 6, and 7 perspective elevations of various modifications in constructive detail, showing the mode of applying my invention.

The illustration. Fig. 1, represents a torsion-pivot balance having two parallel beams, A A, mounted upon torsion-pivots $a\ a$, and connected terminally by torsion-pivots $b\ b$, the whole mounted on a pedestal, B, and furnished with scale-pans $p$, either mounted above or suspended below the beams, as desired, (both modes being shown.)

The particular construction of these features of the balance being fully described in other patents granted to myself and to the late Dr. Roeder, need not be repeated here.

To compensate the resistance of the pivots to pivotal deflection of the beams, a poise-weight, $w$, is mounted upon an oscillating lever-arm, which may be a standard, $s$, attached to one of the beams (the lower in the present case) perpendicularly above the fulcrum-pivots. Now, it will be readily perceived that so long as the pedestal-support is truly perpendicular and the beams truly aligned in horizontal planes the poise $w$ is wholly inert or neutral in relation to the pivots, they also being in a neutral condition as to molecular displacement; but if the balance is "tipped" to one side the poise is thrown out of its true perpendicular, and acts upon the depressed side of the beam, to depress it still more, until the weight is counteracted by the resistance of the pivots. Under these circumstances correct scale-determinations is impossible. To remedy this defect, I erect upon the pedestal a frame, C, consisting of two vertical standards, $c\ c$, and a horizontal yoke, $d$, connecting them above the poise-standard $s$, (which operates between the standards $c$,) and between the standards $c$, through the central axis of the yoke $d$, stretch a torsional pivot, $e$, on which is mounted, to swing in the same plane with the oscillating lever-arm or standard $s$, a vertical lever-arm, $f$, carrying a poise-weight, $w'$.

A contact connection is formed between the upper end of the arm $s$ and the lower end of the lever-arm $f$, constructed in the present case as follows: The lower end of the lever-arm $f$ is extended into a yoke formed by a wire or elastic cord, $g$, stretched around the terminals of bifurcated arms in which the standard $s$ terminates. The wire or cord passes at either side of the arm $f$, in parallel planes at right angles to the general plane of oscillation, thus compelling the oscillation of the arms $s\ f$ in unison in opposite directions.

Any other mode of connecting the arms $s\ f$ may be employed in which friction is reduced to a practical minimum, the object being merely to provide a suitable joint permitting the free movement of each arm upon its own pivot, yet compelling their joint interaction, as hereinafter more fully set forth. Thus if the entire balance is tilted to the left hand—that is, depressed at the left side—the statical moment of the poise $w$ thereby induced is upon the left side of its true perpendicular and tends to depress the left side of the beams; but in such position the statical moment of the poise $w'$, also at the left side of its perpendicular, exerts its gravitating force through its pivotal connection and the yoke upon the arm $s$ in such manner as to exactly counterbalance the statical moment at the poise $w$, so that the arms $s\ f$, although inclined from a true perpendicular, still maintain their poises in proper zero relation to the pivots. If, now, a load is placed upon the scale so that the beams are caused to oscillate upon their pivots, the statical moments of the poises $w\ w'$ are by such oscillation shifted to opposite sides of the perpendicular, and their conjoint action is brought to bear upon the same side of the scale-beams in opposition to the molecular resistance of the pivots. This action will be rendered more clearly intelligible by reference to the diagrams, Figs. 2, 3.

Fig. 2 represents the arms $s\ f$ aligned in a common perpendicular, P P, in which the poises $w\ w'$ are both in neutral position. Now, if the beam A is pivotally deflected into the position indicated by dotted lines, the arms $s\ f$ will also be oscillated into the position shown by dotted lines, in which, as will be obvious, they act conjointly against pivotal resistance.

Fig. 3 represents the entire beam structure tipped to the left, in which position the poises exactly neutralize each other; but if the beam A be further depressed by oscillation upon its fulcrum-pivot and the arms $s\ f$ thrown into the position shown by dotted lines, it will be seen that the auxiliary poise $w'$ is shifted back toward its own perpendicular $p$, in which it is neutral, while the main poise $w$ is carried so far away from its perpendicular P P that its statical moment is magnified by leverage so greatly as to afford a proper counter-balance for pivotal resistance. It will also be obvious that if the movement is further continued in the same direction the poise $w'$ will pass its perpendicular and exert its force in harmony with the main poise, as in the case first illustrated.

Fig. 4 shows a slight modification in constructive detail in that the auxiliary arm $f$ is mounted upon its torsional pivot $e$ below the scale-beam A, and the arm $s$, extended also below the scale-beam, the connection between the two being substantially as before described, the main purpose of the change being to cause the movement of the extended arm $f$ to note upon the graduated arc-plate $x$ in the customary manner, instead of reversing, as shown in Fig. 1. The operation as thus constructed is precisely analogous to that first described.

Fig. 5 exhibits in natural sequence a further modification, in which the scale-beam A, mounted in the usual manner and provided with the poise $w$, is connected by means of a torsional link at one end by a torsion-frame, $h$, with a supplemental lever, $i$, arranged above and torsionally fulcrumed at $k$, beyond the scale-beam, said supplemental lever $i$ being provided with an auxiliary poise-weight, $w'$, as shown. The free end of the lever $i$ is utilized as a pointer, moving upon the graduated arc-plate $x$. The inter-operation of the poises is the same as already described, the object of the modification being convenience of construction merely.

In natural sequence to the last-named modification, Fig. 6 represents the addition to the construction shown in Fig. 5 of an additional lever, $i$, similarly arranged in relation to the beam, connected by an additional frame, $h$, at the opposite end of the beam A. This second lever, $i$, is a lever of the first class torsionally pivoted at $k$ and provided with a poise-weight, $w'$. In this case the poise is omitted from the beam A, the free ends of the supplemental levers are brought nearer together, as shown, and utilized as indicating-pointers.

Fig. 7 shows the application of the same principles to a balance of the steelyard class, in which two beams, $A'A^2$, (levers of the first class,) are fulcrumed on torsion-pivots $a a$ and connected together terminally by a torsion-frame, $h$, the second beam, $A^2$, being also terminally connected by a torsion-frame, $h'$, with an auxiliary lever, $A^3$, (of the second class,) also fulcrumed upon a torsion-pivot, $a'$. The lever $A^3$ is furnished with a sliding weight, $z$, and is also utilized as a pointer. Poises $w w$ are furnished to the main beams, and a poise, $w'$, to the auxiliary beam, having the functions already described. Now, it will be seen that if the beams are pivotally deflected from a true horizontal position the three poises act conjointly, the first two upon the same and the last upon the other side of their respective perpendiculars, in opposition to the combined molecular resistance of the pivots; but if the entire structure is tilted to one side the statical moment of the two main poises is opposed by the statical moment of the auxiliary poise, all in this case acting at the same side of their perpendiculars, producing the result already described.

The described action of the poises in relation to torsion or flexion balances is the same, and produces the same result—namely, to counterbalance the molecular resistance, whether of torsion or flexion, due to the molecular displacement of the bearings, and, as modified by my improvement, to accomplish this result whether the scale structure is in true horizontal alignment or only approximately so.

I do not confine myself in the application of my invention to weighing-balances, inasmuch as the same difficulties exist in and the same advantages accrue from its application to all similar structures wherein an oscillating beam is employed, such as mechanism for testing the strength of metals, &c.

I reserve the type of structure illustrated in Fig. 6 for more specific description and claims under a separate application for Letters Patent, with reference to certain advantages of a practical nature which it offers, additional to the invention hereinbefore specified.

I claim as my invention, and desire to secure by Letters Patent of the United States—

1. In mechanism for scale-determinations of force, as gravity, and involving the molecular displacement of pivotal beam-connections, the combination, with a beam and its molecular connections, of an oscillating weight arranged to counteract the molecular resistance of the beam-connections, and an auxiliary oscillating weight arranged in connection with the beam and its counterpoise, so that a defective horizontal alignment of the beam structure, producing an abnormal statical moment of the beam-counterpoise and affecting the beam in one rotative direction, is counterbalanced and neutralized by a corresponding statical moment of the auxiliary weight, affecting the beam in an opposite rotative direction, thus preserving the beam and connections in normal equilibrio, the arrangement being such, also, that the rotation of the beam compels the joint action of the main and auxiliary poises in opposition to the molecular resistance of the beam-connections, substantially as set forth.

2. In a weighing balance embodying pivotal beam-connections acting by molecular displacement, the combination of an oscillating balance-beam, two pivoted levers, (one of which may be rigidly attached to the balance-beam and act pivotally upon its fulcrum,) and two weights attached to and oscillating with the levers, the beam and levers being connected in such relation that the statical moments of the weights upon one side of their zero positions neutralize each other and upon the other combine in opposing the molecular resistance of the beam-connections, substantially as set forth.

3. In a molecular pivot-balance, the combination of the balance-beam, a weight arranged to oscillate with the beam and normally oppose the molecular resistance of the pivotal connections, and an auxiliary weight arranged in suitable oscillating connection with the first to counteract any abnormal statical moment thereof due to imperfect leveling of the balance, substantially as set forth.

4. In a molecular pivot-balance, in combination with a balance-beam provided with a fixed vertical standard rising above its fulcrum-pivot and carrying a poise-weight, an independently-pivoted vertical standard pivotally connected with the beam and also carrying a poise-weight in such relation that the poises oscillate in opposite directions, as and for the purpose set forth.

In testimony whereof I have hereunto set my hand in the presence of two subscribing witnesses.

ALFRED SPRINGER.

Witnesses:
L. M. HOSEA,
R. D. GALLAGHER.